UNITED STATES PATENT OFFICE 2,085,129

PRODUCTION OF COLLOIDAL METAL HYDROXIDES

Fritz Stoewener, Ludwigshafen-on-the-Rhine, Germany, assignor to I. G. Farbenindustrie Aktiengesellschaft, Frankfort - on - the - Main, Germany No Drawing. Application July 10, 1934, Serial No. 734,516. In Germany July 15, 1933

16 Claims. (Cl. 252—6)

The present invention relates to the production of metal oxides which are colloidally soluble in water.

It has already been proposed to prepare alumina which is colloidally soluble in water (reversible alumina gel or solid alumina sol) by causing aqueous solutions of aluminium salts to react with ammonia or ammonia solutions, freeing the resulting alumina hydrate from the ammonium salts formed during the reaction by washing, peptizing and evaporating the resulting solution of alumina to dryness. The yield of alumina sol is always very low, however, because hitherto either a great excess or a great deficiency of ammonia has been used. In order to obtain pure, stable alumina solutions, from which dry products are obtainable which are to a great extent soluble even in cold water, the alumina hydrate to be peptized must be washed until it is as poor in salts as possible. In order to obtain an alumina hydrate which could be washed out readily and without waste it has hitherto been thought that a great excess of ammonia must be used. An alumina hydrate produced in the said manner changes very rapidly in the presence of the salts under the influence of the alkaline reaction whereby the peptization, as for example with acids, is rendered very difficult and the yield of sol is substantially diminished. If, on the other hand, a great deficiency of ammonia is employed, the resulting hydrate can only be washed with difficulty, the waste of alumina during the slow washing being quite considerable. This method leads to an alumina hydrate which does not undergo change and can therefore be peptized, but the total yield of soluble alumina or colloidal alumina solution is very low.

I have now found that the said drawbacks are overcome and colloidal hydroxides, i. e. hydroxides colloidally soluble in water, can be obtained in an excellent condition and in practically quantitative yields by causing salts of trivalent metals, as for example of iron or chromium and especially of aluminium, to act in approximately stoichiometrical ratio on agents which are suitable for decomposing the said salts with the formation of hydroxides, the resulting hydroxides being freed from the salts formed during the decomposition and subjected to a treatment with peptizing agents.

The peptization of the hydroxides of iron or chromium, for the preparation of which the chlorides or nitrates are advantageously employed, is preferably effected while employing from 10 to 20 percent of the amount of hydrochloric acid theoretically necessary for the formation of the salt. It is advantageous, especially in order to obtain water-soluble alumina or stable solutions thereof, to cause either aluminium salts and bases, especially alkalies including ammonia and amines, as for example aniline, or aluminates and acids to act on each other in approximately stoichiometrical proportions (that is while avoiding a large excess of one of the components) if desired in several stages, the resulting alumina hydrate, if desired after a cautious drying, being then washed and peptized. The reaction is preferably carried out while heating, if desired by leading in hot water or steam. The peptization may be assisted by a cautious withdrawal of water until the formation of a jelly or even of a solid, soluble (reversible) gel; a cautious withdrawal of water may also be carried out after the peptization, preferably at from 80° to 120° C., but below 200° C.

It is especially advantageous to cause hydrochloric acid solutions, or advantageously nitric acid solutions of alumina hydrate obtained by alkaline decomposition of bauxite and preferably still containing water to react with such an amount of ammonia that the reaction mixture has a pH value between 6 and 8, to wash the resulting hydroxide thoroughly, if desired after separating the mother liquor, to mix it with from about 5 to 15 per cent of the amount of hydrochloric acid or acetic acid theoretically necessary for the formation of the salt and then to concentrate it at moderate temperature, advantageously in vacuo, until it contains from about 40 to 50 per cent of alumina. By the peptization of a well-washed gel with for example 10 per cent of hydrochloric acid, there is obtained after evaporation a reversible gel which can be rapidly converted into a colloidal solution even in cold water. When employing only 5 per cent of hydrochloric acid, the speed of dissolution of the gel is somewhat lower so that hot water is preferably employed for the dissolution. The sols then obtained are, however, more stable to coagulating influences than sols obtained by peptization with 10 per cent of hydrochloric acid. If the degree of purity of the hydroxide as regards salts, as for example ammonium nitrate, is comparatively low, somewhat more acid, as for example 15 per cent of the theoretical amount, must be employed in order to produce readily soluble products. A great advantage of reversible gels lies in the fact that they may be transported much more cheaply than aqueous solutions. They may then be converted at the place of employment into colloidal solutions or jellies by means of water or steam. As a result of the peptization final products may also be obtained which are liquids or jellies by using an amount of water sufficient for the formation of a solution or jelly and dispensing with the concentration of the solution. Working in this manner has the advantage that the colloidal solutions may be freed from any insoluble constituents present by filtration, sedimentation or centrifuging, so that the separation of any insoluble or very finely suspended constituents incapable of being removed by filtration in the preparation of a solution of aluminium chloride or nitrate by dissolving alumina hydrate in hydrochloric or nitric acid may be dispensed with because all of the insoluble materials may be subsequently separated from the sol. The mother liquors, containing ammonium chloride or ammonium nitrate, may be worked up into fertilizer salts, the small amounts of aluminium or iron salts contributing to the prevention of the caking of the fertilizers. In those cases where the final product may permissibly contain iron, the aluminium salt solutions containing iron salts obtainable by the acid decomposition of minerals and ores, as for example clay, bauxite, glauconite, leucite, slags, labradorite, feldspar and the like, may be employed with advantage.

Excellent products may also be obtained by causing the alkali metal aluminate solutions obtained by the alkaline decomposition of artificial or natural aluminiferous materials, especially bauxite or slags, to react, after the separation of iron hydroxide, with practically the stoichiometrical amount of acid, advantageously nitric acid, rapidly separating the salts formed and peptizing the alumina hydrate after thorough washing. A procedure may also be employed in which the precipitation of the hydrated alumina is effected in the known manner with carbon dioxide or by stirring with alumina hydrate. The main amount of the resulting soda solution or caustic soda solution is then rapidly separated for use together with the washing water obtained by a short washing of the alumina, if desired after evaporation, for the decomposition of further amounts of bauxite etc. The alumina hydrate, while still fresh, is treated with an amount of a strong mineral acid, in particular hydrochloric acid, corresponding to its alkalinity or with an excess thereof in which case the excess is subsequently practically removed by means of soda, caustic soda, aluminate or ammonia, and the hydrate then peptized after thorough washing. It is preferable to carry out the peptization while heating under pressure because the yield of the colloidally soluble fraction is thus increased.

Furthermore it has been found to be advantageous to react the acid component (aluminium salt or acid) first with only a part of the basic component (alkali or ammonia or alkali metal aluminate), preferably with from 70 to 90 per cent of the stoichiometrical amount, under such conditions of concentration and temperature that a slightly acid sol is formed the solidification of which to a jelly is effected by the addition of coagulants. The jelly, after its solidification, is then broken into pieces and treated with an amount of the basic component sufficient to make up practically the stoichiometrical amount of the basic component; it is then washed and peptized.

Moreover, alumina hydrate insoluble in water may be worked up, preferably in a ball mill, with an amount of acid or alkali metal hydroxide insufficient for complete dissolution, the mass treated with practically the stoichiometrical amount of alkali metal hydroxide or acid having regard to the amount of acid or alkali metal hydroxide employed, the mixture washed and dried cautiously in the presence of peptizing agents. The washing process may be carried out especially readily because the insoluble material acts as a substratum for the colloid. The gel then dissolves to form not so much a clear solution as a difficultly settling suspension in which the colloidally dispersed fraction serves as a protective colloid for the coarser particles.

By reason of the fact that the products obtainable according to this invention are to serve, among others, as substitutes for cheap aluminium salts, as for example alum, a practically complete recovery of the salts contained in the mother liquors is frequently necessary for economical reasons. For this purpose it is necessary for the alumina hydrate to be peptized to be present in a readily filterable and washable form. This is advantageously effected by subjecting the mixture obtained by the precipitation of the aluminium salt solution with ammonia or the aluminate solution with acid (or the corresponding chromium hydroxide, iron hydroxide or the like) to a strong mechanical treatment, such as grinding, beating, rolling, kneading or pounding, then separating the resulting alkali salts, as for example ammonium or sodium nitrate, on a suction filter or rotary filter or by means of a centrifuge, and thoroughly washing the resulting hydroxides, if desired while interposing one or more times a mechanical treatment, preferably in a ball mill. In this manner a readily washable hydroxide which peptizes well is obtained even when the stoichiometrical proportions are less accurately maintained during the conversion. It is of practical importance for the economy of the process also to carry out the reaction of the metal salt to be worked up, as for example of the aluminium nitrate solution with ammonia solution, in a ball mill, a grinding for one hour frequently being sufficient to obtain a mixture which is readily filtered. The reaction may also be carried out with gaseous ammonia. In this case the main portion, for example of the aluminium salt solution, which in order to avoid plugging of the pipe conduits should not be too concentrated, is preferably saturated with gaseous ammonia, the remainder being added in the form of a solution. A well filterable reaction mixture may also be obtained without use of a ball mill by causing the solution of the aluminium salt continuously to run, in conjunction with dissolved or gaseous ammonia, into the reaction vessel provided with an overflow pipe.

In all cases it is preferable so to select the concentration of the mass to be peptized and of the peptizing agent that the mixture of the two before drying contains at least 30 grams of anhydrous oxide (as for example $Al_2O_3$, $Fe_2O_3$ or $Cr_2O_3$) per liter.

Generally speaking a part of the salt formed during the reaction, as for example ammonium nitrate, may remain in the gel without impairing the solubility and stability of the gel. For many purposes, however, these salts may have an injurious effect.

I have further found that by the extraction of the gels, advantageously with organic solvents, as for example ethyl or methyl alcohol, or with liquid ammonia, a far-reaching freeing of the water-soluble gel from salts or salt residues can be carried out, as for example in a Soxhlett apparatus, without any large amount of the gel being dissolved by the extraction liquid. It is also advantageous to proceed by freeing the homogeneous mass obtained, for example by the reaction of the aluminium salt with ammonia in a ball mill, from the mother liquor, as for example by centrifuging, on a suction filter or on a rotary filter, peptization (if desired after a short washing), drying and extraction then being carried out. The washing need only be carried as far as the available apparatus permits, the final purification being carried out by means of organic solvents. Alternatively the hydroxide obtained by the reaction of the metal salt solution with ammonia is peptized without previous separation of the ammonium salts, dried and then extracted with organic solvents.

Iron salts, which may pass into the alumina gel for example when working in iron apparatus, may be subsequently removed by extracting the gel with acetone. The initial materials may even be aluminium salt solutions containing iron such as are obtained by the decomposition of calcined clay, leucite, glauconite, slags or bauxite with hydrochloric or nitric acid, a subsequent removal of the iron by means of suitable solvents, such as acetone, cyclohexanol or ether, being carried out in cases when an alumina gel free from iron is desired. Mixtures of solvents may also be employed, as for example ethyl alcohol and acetone, so that, for example, ammonium salts and iron salts are simultaneously removed. In the case of alumina gels containing large amounts of iron, the amount of peptizing agent depends on the iron content. It should if possible be large enough to convert the iron into iron salts, as for example the oxychloride. In cases when oxidic iron is still present in the product to be extracted, hydrochloric acid or hydrogen chloride may be added to the acetone or a treatment with acid may precede the extraction.

When the removal from the colloid of the salts formed during the reaction is effected wholly or partly by means of organic solvents, the colloid need not be produced while maintaining stoichiometrical proportions because a long washing process with water may be dispensed with and the difficulties encountered in washing by reason of the excess of one of the components in the reaction thus avoided. This is especially the case in the subsequent removal of iron from gels which have been prepared for example from a solution of aluminium and iron salts obtained by acid decomposition of clay, although in order to avoid waste it is also preferable in this case to maintain the stoichiometrical proportions as far as practicable.

A very far-reaching removal of the ammonium salts may also be effected with water by subjecting the mixture obtained by the reaction, preferably after mechanical separation of the mother liquor (which separation is not, however, necessary), to a cautious drying, if desired while spraying, and then carrying out a lixiviation of the mass with water, the mass not being too finely divided but preferably in pieces of the size of hazel nuts. Too much water should not be employed at once because in that case there is the danger that the whole mass may pass into solution with the formation of a sol containing large amounts of salts. Only so much water should be employed as rapidly forms a saturated salt solution over the alumina, because no dispersion of alumina with the formation of a sol takes place in such a solution. After the salts have thus to a great extent been removed from the gel, the latter is freed by suction filtration from the last traces of salt solution and then dried or mixed with water whereby, without the addition of a peptizing agent, a dispersion to form a sol takes place, the sol being filtered if necessary. The peptization may also be assisted by adding peptizing agents, as for example acids, either before the reaction, (as for example of the aluminium salt with ammonia) or before the drying of the mixture primarily formed, but preferably after separation of the salts. It is preferable to proceed by first filtering by suction the mother liquor from the mixture obtained by the reaction, drying the latter and washing the dry mass with the mother liquor or parts of the same. The resulting water-soluble gels may be extracted in the manner already described, for example with organic solvents if iron salts or other salts, as for example ammonium salts, are to be removed. The stoichiometrical proportions are preferably maintained when working in the said manner, although slight deviations, especially a deficiency of ammonia, are only slightly injurious.

In the preparation of water-soluble alumina, aluminium salt solutions may be employed as initial materials, for example those which are obtained as valueless waste products in organic catalytic reactions and syntheses.

The sols obtainable according to this invention are suitable for a great variety of purposes. They may be used for waterproofing building materials constructed from hydraulic binding agents or binding agents which harden in the air; as for example concrete, cement mortar or lime mortar, or for waterproofing insulating masses prepared for example according to British Patent No. 336,318, the liquid or solid sols being incorporated with the materials to be mixed or with the necessary water. The liquid sols may also be used, if desired together with other substances, as for example silica sol, lime water, ammonia and other substances, for waterproofing parts of buildings or building elements constructed of porous material, as for example porous bricks, stones, tiles, plates, pipes, walls, floor coverings, wall coverings, light stones, asbestos plates, cork plates or gypsum plates, or insulating masses, such as diatomite, or the said insulating masses prepared according to the said British Patent No. 336,318, either by coating them superficially with a film of the sols by spraying or painting, or by impregnating them with the sols. If necessary, the materials may be subsequently heated to high temperatures, as for example from 100° to 400° C., or treated for example with ammonia water.

The sols are also suitable for the preparation of adherent, if desired transparent, coatings free from cracks on articles of all kinds. Glass plates which have been coated for example with a film of alumina gel will withstand temperatures of 400° C. and more without the film being destroyed. Films of alumina may be applied to show window panes and spectacle glasses (especially in gas masks) to protect them from becoming coated in moist air (breath-proof). The sols may also be used for glazing ceramic bodies, as for example silicon articles, the bodies being subsequently fired. When employed as a varnish on wood or tapestry, the sols impart gloss and washability. The sols, if desired with an addition of other substances, are suitable for the impregnation of wood, textiles, threads, fabrics, paper and pasteboard, whether for the purpose of rendering them waterproof, protecting them from putrefaction or reducing their combustibilty. They may also be used, if desired together with gelatine, as agents for forming or stabilizing emulsions in the preparation of petroleum, wax, oil or paraffin emulsions. The sols or the jelly particles obtained therefrom are also suitable for the preparation for example of concentratable thick juice from sugar beet slices, for the precipitation of floating substances in solutions, such as fats, starch, yeast albumen and gelatinous substances and also rubber raw materials, for the enrichment of enzymes, as mordants for fabrics and leather, for use in the lacquer industries, dye-works, and in the preparation of yeast, wine and beer and as substitutes for lubricants. The sols and jellies may also be employed for the refining, desulphurizing and deodorizing of solutions, oils and hydrocarbons. They are also suitable as initial materials for the preparation of salts of organic acids, as for example of acetic acid, formic acid, lactic acid, citric acid, tartaric acid, stearic acid, salicylic acid or pyrogallol.

The sols of the hydroxides of iron, chromium and alumina are eminently suitable as tanning agents, alumina sols being especially suitable for tawing. Contrasted with tawed leather obtained by tanning with alum, leather tanned with alumina sols is washable. The sols may also be employed in the preparation of colored leather.

The sols, especially the alumina sols, are excellent protective colloids in the preparation of sols or of difficultly precipitatable suspensions from metals, metalloids and metal compounds, as for example sulphur suspensions of sulphur and latex and may be employed with advantage for carrying out the process described in the German Patent No. 593,416. They may also be employed as agents for combating pests, preventing dry rot, preventing putrefaction, preserving eggs, impregnating tobacco to deprive the smoke of poison, for preventing rust, polishing, washing and cleaning or as additions to agents employed for these purposes. They may also be employed as coagulating agents, for example for latex, as fillers for rubber and rubber-like substances, pasteboard and paper and for weighting silk. They constitute excellent adhesives and cements for glass, metals and ceramic masses; they are suitable as binding agents in the sizing of paper, in the preparation of silicon bricks, metal bricks, magnet cores, safety glass, in the briquetting of coke, mineral coal and the like and in the preparation of fireproof tile.

The sols may also serve for the solidification of colloids and in the preparation of artificial composition and compressed masses of all kinds, as for example of urea-condensation products. They may also serve as masses producing the framework for the solidification of liquids, as for example alcohols, which are brought into commerce in tubes, by mixing the liquid or solid gel (the latter after swelling) with alcohols and coagulating, if desired by the addition of electrolytes, as for example in the production of solid or pasty burning spirits or in the solidification of perfumes or scouring water, the tube in the latter case being provided with a filter so that merely the liquid and not the substance of the framework is pressed from the tube. Alcosols, alcogels, benzene sols, benzene gels and other organosols and organogels may also be prepared from the sols, the initial materials being either liquid or solid sols of jellies. The pure sols or the jellies obtainable therefrom may also be charged into tubes, as for example alumina sol for employment for medicinal purposes, for example as a substitute for aluminium acetate, when it is not desired to employ solid sols for the purpose. In this connection, sols which have been prepared by peptization with organic acids, as for example acetic acid, are especially suitable. The sols may also be worked up with fats and oils, as for example wool grease, to form salves.

The solid and liquid sols and jellies leave behind, by the addition of suitable electrolytes or by very sharp drying, as for example at 400° C., or by drying for a long time at temperatures lower than the said temperature, dry residues which no longer dissolve in water, i. e. the so-called irreversible gels. These have a high adsorptive capacity for dissolved substances, gases and vapors and may be employed as catalysts or purifying masses, or as carriers therefor for the refining of oils and hydrocarbons, as for example benzines, for the desulphurization of gases and liquids, for the purification and clarification, as well as the desilicification and dechlorination of water, furthermore as base-exchange bodies or as carriers therefor. Compact or porous carrier substances, as for example glass beads, bauxite, active alumina, silica gel, pumice, clay or base-exchange substances, which have been superficially coated with a film of alumina sol, iron hydroxide sol or the like or which have been impregnated therewith, the film being if desired rendered insoluble by the action of electrolytes or by sharp heating, may also be employed for the same purposes. The sols are also suitable as binding agents in shaping bleaching earths, active substances, as for example active carbon, gels, base-exchange substances and catalysts or as the initial materials for catalysts or desulphurizing masses, as for example so-called red sludge, by grinding the said substances in a ball mill together with the sols and a suitable amount of water, shaping the mass, drying and activating by heating, a washing process being interposed if desired.

The following examples will further illustrate the nature of this invention but the invention is not restricted to these examples.

*Example 1*

160 kilograms of iron-free alumina hydrate, containing 102 kilograms of $Al_2O_3$ and obtained from bauxite by alkaline decomposition, are dissolved at from about 90° to 100° C. while stirring in a closed stirring vessel with the amount of 35 per cent nitric acid stoichiometrically necessary for the formation of aluminium nitrate, by first causing the alumina hydrate to react with 945 kilograms of 40 per cent nitric acid and then stirring 135 kilograms of water into the mixture. From about 2 to 3 kilograms of $Al_2O_3$ remain undissolved so that the aluminium nitrate solution clarified by filtration and sedimentation (including the small amount of water used for washing the insoluble residue) contains an excess of nitric acid of from about 2 to 3 per cent over the stoichiometrically necessary amount, i. e. from about 0.5 to 0.9 per cent by weight of free nitric acid. The undissolved fraction is worked up again with a fresh batch.

The aluminium nitrate solution is then treated with the amount of ammonia stoichiometrically necessary for reaction with the nitric acid employed (510 kilograms of a 20 per cent by weight aqueous ammonia solution) in an iron ball mill lined with aluminium sheet or rubber, the mixture being heated while being homogenized vigorously. It is then pumped onto a suction filter or a rotary filter and filtered as dry as possible, if possible washed twice with a little hot condensed water, ground again in the ball mill for a short time (from half to one hour) with the addition of a little hot condensed water or steam and again led to the suction filter or rotary filter. This procedure is repeated until no further improvement in the speed of filtration is obtainable by grinding and the mass has become rather slimy. The mother liquor together with the comparatively concentrated washing water first obtained is worked up into fertilizer in a multiple evaporator. The washed cake of jelly, filtered as dry as possible, is then heated while kneading vigorously with 73 kilograms of 30 per cent hydrochloric acid, the mass acquiring a salve-like nature. If the cake is too dry, a little water may be added to the mass for the purpose of rapidly obtaining a better homogeneity. It is important that any lumps present be crushed to a great extent. The paste is then dried at from 100° to 120° C. until it has a water content of from about 50 to 55 per cent and then comminuted. The resulting product is soluble in cold water.

Example 2

The aluminium nitrate solution prepared according to Example 1 is caused to react in two stages with the amount of ammonia stoichiometrically necessary. The first of these two stages is carried out in such a manner that a crude sol is obtained. For this purpose 440 kilograms of an aqueous 20 per cent by weight ammonia solution (i. e. 86.3 per cent of the amount stoichiometrically necessary for the conversion of the aluminium nitrate into aluminium hydroxide) are allowed to flow gradually while stirring well into the aluminium nitrate solution heated to from 65° to 70° C., any aluminium hydroxide precipitated being brought into solution again by stirring before the addition of fresh ammonia solution. The fairly clear crude sol is allowed to cool to about 25° C. and then 65 kilograms of a 50 per cent potassium acetate solution are added while stirring. The sol is then allowed to flow into flat vats of sheet aluminium in which it gradually solidifies giving a water-clear jelly. After having been allowed to stand for about 48 hours, the jelly is cut up into pieces. These are placed in a large container and exactly the amount of ammonia (13.7 per cent) still lacking to make up the amount necessary for the conversion of the aluminium nitrate in the jelly, i. e. 70 kilograms of 20 per cent aqueous ammonia solution which have previously been diluted with 748 kilograms of water, are poured over this product. After allowing the reaction to continue for about four hours, the granular mass is filtered on a suction filter until it is as dry as possible and then washed several times with the smallest possible amount of condensed water which is supplied wholly or partly in the form of steam. It is advantageous to interpose a homogenization of the mass in a ball mill between the third and fourth washing process. The further working up of the jelly (peptization and drying) and the working up of the mother liquor to solid ammonium nitrate are effected in the manner described in Example 1.

Example 3

2000 kilograms of aluminium nitrate solution having an aluminium content of 4.71 per cent and a nitrogen content of 7.16 per cent are caused to react with from 908 to 926 kilograms of 18.98 per cent aqueous ammonia solution (i. e. from 99 to 101 per cent of the stoichiometrical amount) while grinding for an hour in a ball mill. The residue obtained after filtration is dried at from 80° to 100° C. and then stirred for a short time with the liquid obtained by the filtration, a very readily filterable and washable mass being obtained which is again filtered. The resulting filter cake is washed thoroughly with water, containing a small amount of ammonia the washing water being added to the filtrate previously obtained. This contains from 97 to 98 per cent of the whole of the nitrogen employed in the form of an about 42 per cent ammonium nitrate solution. The filter cake, the further purification of which is usually unnecessary and which contains about 272 kilograms of aluminium hydroxide and the residual amount of ammonium nitrate, is well kneaded with from 2.5 to 5 per cent of the amount of peptizing agent stoichiometrically necessary for the formation of salt, as for example with 50 kilograms of 38 per cent hydrochloric acid or 53 kilograms of 62 per cent nitric acid or 31 kilograms of glacial acetic acid, liquefaction taking place with the formation of a colloidal solution which may if necessary be clarified by means of a centrifuge with the employment of a collodion filter. By cautious drying, as for example by spraying, gels may be obtained which are soluble with swelling in cold water.

Example 4

Aluminium nitrate solution and aqueous ammonia solution of the concentration specified in Example 3 are allowed to flow in a thin stream into a vessel of aluminium or V2A-steel provided with means for intense stirring, a deficiency of 2 per cent of ammonia being employed. The vessel is provided with an overflow pipe through which part of the mixture formed by the reaction flows through a pair of rollers to a rotary filter. The mass is filtered as dry as possible and led by a conveyor band to a second pair of rollers for the purpose of homogenization, whence after passing through a roller dryer it passes into a mixing drum in which it is lixiviated with the mother liquor obtained in the rotary filter, or onto a sieve-band on which the lixiviation is effected continuously by spraying with the said mother liquor. The mixture or the lixiviated residue is freed from adherent mother liquor by means of a centrifuge, washed with the smallest possible amount of water containing a small amount of ammonia and centrifuged until dried to a great extent. The centrifuge residue is an alumina hydrate containing only small amounts of ammonium nitrate. In the moist state and also after drying at from 80° to 120° C. it does not alter appreciably and therefore, even after drying, is distinguished by high reactivity, ready peptizability and great solubility in acids and is consequently eminently suitable for the preparation of salts of organic acids, catalysts and adsorption agents. For the purpose of preparing a stable colloidal solution, it is subjected to a treatment with a small amount of a peptizing agent, as for example hydrochloric acid, nitric acid, formic acid, acetic acid or oxalic acid.

Example 5

Solid iron-free aluminium chloride or nitrate (obtained by the decomposition of clay, leucite or slags with hydrochloric or nitric acid under pressure and crystallization of the resulting solution) is treated with approximately the stoichiometrically necessary amount of 20 per cent aqueous ammonia solution or with the corresponding amount of liquid or gaseous ammonia. The resulting precipitate or the reaction mixture is dried, stirred with mother liquor or water and centrifuged and finally washed with water containing ammonia in an amount of about 1 per cent of the aluminium oxide. The very reactive centrifuge residue is peptized with peptizing agents while simultaneously drying.

Example 6

203 kilograms of alumina hydrate having an $Al_2O_3$ content of 50.23 per cent by weight are heated with 1107 kilograms of a 21.7 per cent caustic soda solution while stirring, 1050 litres of a sodium aluminate solution having a specific gravity of 1.25 being formed. This is stirred rather rapidly into 586 kilograms of 37.75 per cent hydrochloric acid (equivalent to a 1 per cent excess). The readily filterable and washable mass which has been homogenized by grinding for an hour in a ball mill and which contains about 100 grams of $Al(OH)_3$ per litre is separated on a suction filter. The solid residue is thoroughly washed, intimately triturated with 58 kilograms of a 37.75 per cent hydrochloric acid and converted into a water-soluble gel by drying at 80° C.

Example 7

100 litres of an iron nitrate solution obtained from roasted pyrites or red sludge and containing 3.27 kilograms of iron and 2.5 kilograms of nitrogen are precipitated at the boiling point with 15 litres of ammonia solution containing in all from 2.91 to 2.97 kilograms of ammonia. The precipitate is washed thoroughly and then intimately triturated with 1.685 kilograms of 38 per cent hydrochloric acid. After drying at 80° C., a water-soluble gel is obtained the aqueous solution of which is very suitable for example as an agent for waterproofing concrete.

Example 8

100 litres of chromium nitrate solution containing in all 1.46 kilograms of nitrogen and 1.99 kilograms of chromium are precipitated at the boiling point with 9.6 litres of aqueous ammonia containing 1.7 kilograms of $NH_3$ (i. e. with 96 per cent of the amount stoichiometrically necessary), the mixture being filtered while hot and the precipitate washed while hot. The washed residue is triturated with 1.4 litres of 38 per cent hydrochloric acid as a peptizing agent (i. e. with about 15 per cent of the amount of acid required for the complete conversion of the chromium into chromium chloride) until a homogeneous paste is obtained which is then dried in a cautious manner at 50° C.; a reversible chromium hydroxide gel is obtained.

Example 9

100 litres of nickel nitrate solution containing in all 2.32 kilograms of nitrogen and 4.77 kilograms of nickel are precipitated at the boiling point with 32.50 litres of caustic soda solution containing 6.35 kilograms of NaOH (i. e. with 98 per cent of the amount of caustic soda stoichiometrically necessary), the mixture being filtered while hot and the precipitate washed while hot. The washed residue is intimately triturated with 2.7 litres of 38 per cent hydrochloric acid as a peptizing agent (i. e. with about 20 per cent of the amount of acid necessary for the complete conversion of the nickel into nickelous chloride) until a homogeneous paste is obtained; the latter is then brought by cautious drying at from 60° to 70° C. to a content of about 60 per cent of NiO, a reversible nickel hydroxide gel thus being formed.

Example 10

100 kilograms of crystallized aluminium nitrate $(Al(NO_3)_3.9H_2O)$ are heated with 24 kilograms of urea, the mass thereby melting and water and carbon dioxide commencing to escape with strong foaming at about 120° C. The residue which consists of finely divided aluminium hydroxide and nitrogen salts and which, depending on whether the reaction is carried out in an open vessel or under reflux, is in the form of a solid foam or hard grains, is in the former case crushed and heated to 150° C. and in the second case heated with a little water. The residue is then thoroughly washed, the washing being very readily effected. The resulting liquid is worked up into a fertilizer while the residue, consisting of aluminium hydroxide, which is extremely readily soluble in acid, is peptized with a peptizing agent, such as acetic acid, tartaric acid, citric acid, lactic acid, salicylic acid or aluminium nitrate or chloride. Instead of urea, there may also be employed ammonium carbamate and other ammonium salts capable of being readily split, as for example ammonium sulphide, and also aniline or pyridine in which case, however, it is preferable to work in the presence of water.

What I claim is:—

1. The process of producing colloid-hydroxide substances colloidally soluble in water, which comprises causing a salt of a trivalent metal to act in an approximately stoichiometrical ratio on an agent capable of decomposing said salt with the formation of hydroxide, freeing the hydroxide obtained from the salt formed during the decomposition and subjecting it to a treatment with a peptizing agent and a cautious withdrawal of water not impairing the water solubility until the formation of a concentrated solution, a soluble jelly or of a soluble solid gel.

2. The process of producing colloid-hydroxide substances colloidally soluble in water, which comprises causing a salt of a trivalent metal to act in an approximately stoichiometrical ratio on ammonia, whereby said salt is decomposed with the formation of an hydroxide of the trivalent metal and by-product ammonium salts, freeing the hydroxide thus obtained from the by-product ammonium salt and subjecting the hydroxide to a treatment with a peptizing agent and a cautious withdrawal of water not impairing the water solubility until the formation of a concentrated solution, a soluble jelly or a soluble solid gel.

3. The process of producing colloid-hydroxide substances colloidally soluble in water, which comprises causing an aluminium salt to act in an approximately stoichiometrical ratio on ammonia, freeing the hydroxide obtained from the salt formed during the decomposition and subjecting it to a treatment with a peptizing agent and a cautious withdrawal of water not impairing the water solubility until the formation of a concentrated solution, a soluble jelly or of a soluble solid gel.

4. The process of producing colloid-hydroxide substances colloidally soluble in water, which comprises causing a salt of a trivalent metal to act in an approximately stoichiometrical ratio on an agent capable of decomposing said salt with the formation of hydroxide, subjecting the resulting hydroxide to a mechanical treatment by grinding in a ball mill, separating off the resulting salt, washing out the impurities from the remaining aluminium hydroxide and subjecting it to a treatment with a peptizing agent.

5. The process of producing colloid-hydroxide substances colloidally soluble in water, which comprises causing a salt of a trivalent metal to act in an approximately stoichiometrical ratio on an agent capable of decomposing said salt with the formation of hydroxide, freeing the hydroxide obtained from the salt formed during the decomposition and subjecting it to a treatment with a peptizing agent, the concentration of the mass to be peptized and of the peptizing agent being so selected that the mixture of the two before drying contains at least 30 grams of anhydrous oxide per liter.

6. The process as defined in claim 1, characterized in that the decomposing agent is a mineral acid.

7. The process as defined in claim 1, characterized in that the decomposing agent is a mineral acid and in that the precipitation of the metal hydroxide is effected in stages, in the final stage of which an amount of mineral acid is employed which is substantially stoichometrically equivalent to the alkali metal content of the reaction product of the previous stage.

8. The process of producing colloid-hydroxide substances colloidally soluble in water, which comprises precipitating trivalent metal hydroxide from a solution of a salt of a trivalent metal by reacting the trivalent metal salt with a decomposing agent therefor while maintaining the reaction mixture at a pH value between 6 and 8, freeing the trivalent metal hydroxide thus obtained from the salt formed by the reaction, and subjecting it to a treatment with a peptizing agent.

9. The process as defined in claim 1, characterized in that the decomposing agent is a mineral acid and in that the precipitation of the metal hydroxide is effected in stages, in the first stage of which a solution of an alkali metal salt of the trivalent metal is stirred with added hydroxide of the trivalent metal, and in the final stage of which an amount of mineral acid is employed which is substantially stoichiometrically equivalent to the alkali metal content of the reaction product of the previous stage.

10. The process as defined in claim 1, characterized in that the hydroxide product produced by the decomposition is washed with water whereby to remove therefrom salt formed in the decomposition.

11. The process as defined in claim 1, characterized in that the decomposition is performed in several stages.

12. The process as defined in claim 1, characterized in that the decomposition is performed in several stages between which the hydroxide formed is subjected to a solidifying treatment.

13. The process as defined in claim 1, characterized in that the peptization is carried out while heating under pressure.

14. The process as defined in claim 2 characterized in that the hydroxide gel is freed from ammonium salts contained therein as by-products by extraction with a solvent for ammonium salts esentially free from water and which does not dissolve the hydroxide gel.

15. The process as defined in claim 2 characterized in that the hydroxide gel is freed from ammonium salts contained therein as by-products by extraction with a substance selected from the group consisting of methyl alcohol and ethyl alcohol.

16. The process as defined in claim 2 characterized in that the hydroxide gel is freed from ammonium salts contained therein as by-products by extraction with liquid ammonia.

FRITZ STOEWENER.